Nov. 17, 1942.  H. V. POWNELL  2,302,569
VEHICLE BODY
Filed May 14, 1941
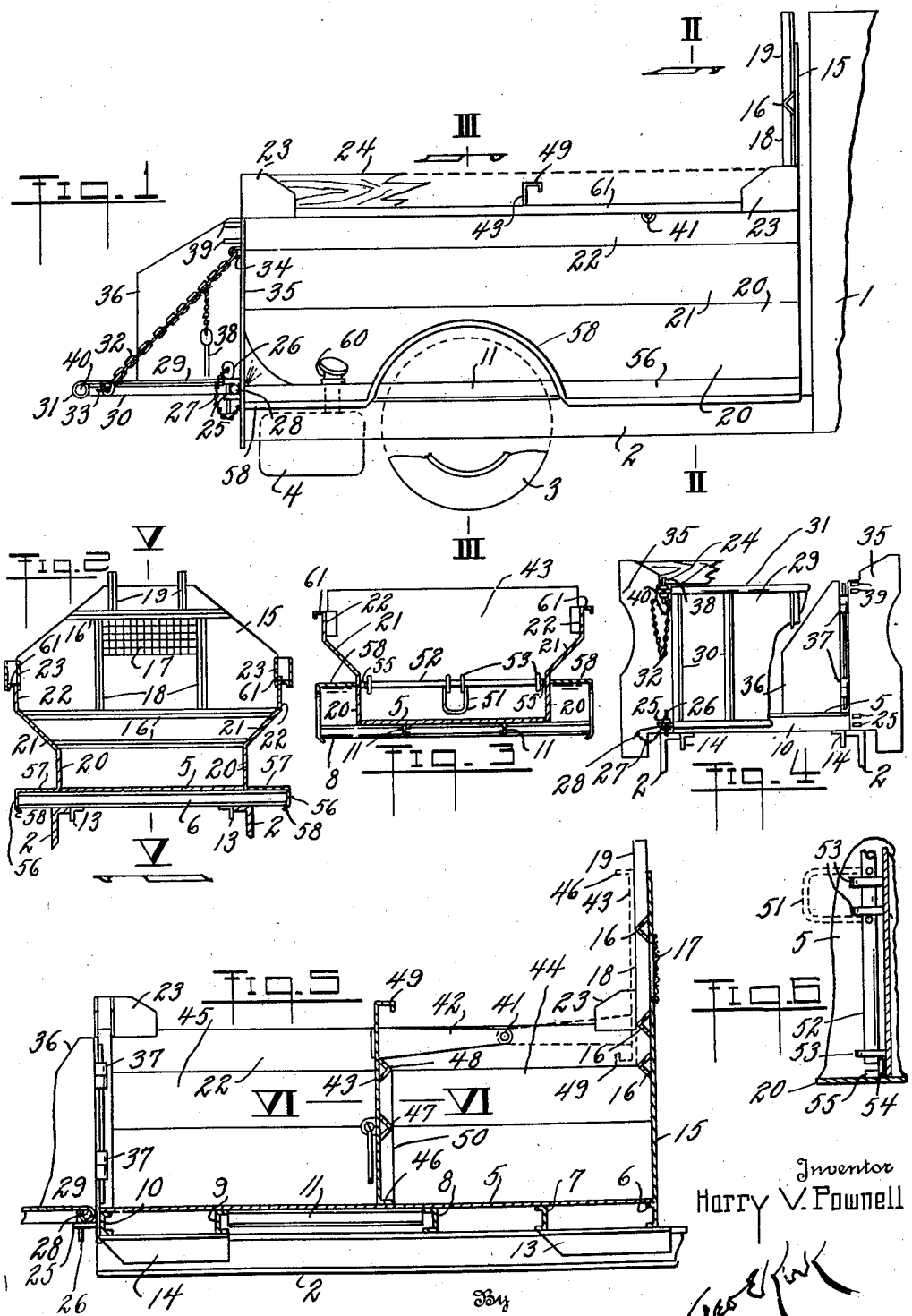
Inventor
Harry V. Pownell Patented Nov. 17, 1942

2,302,569

UNITED STATES PATENT OFFICE 2,302,569

VEHICLE BODY

Harry V. Pownell, Toledo, Ohio

Application May 14, 1941, Serial No. 393,351

3 Claims. (Cl. 296—50)

This invention relates to adjustable capacity containers.

This invention has utility when incorporated in vehicle bodies, especially for handling a plurality of characters or quantities of bulk materials.

Referring to the drawing:

Fig. 1 is a side elevation, with parts broken away, of an embodiment of the invention as a truck body;

Fig. 2 is a section on the line II—II, Fig. 1, showing the forward end of the body;

Fig. 3 is a section on the line III—III, Fig. 1, showing the mid-portion of the body with the partition in place;

Fig. 4 is a view of the body from the rear, parts being broken away;

Fig. 5 is a section on the line V—V, Fig. 2, showing the general frame structure of the body and the positions to which the partition may swing; and Fig. 6 is a fragmentary detail view of the lock for holding the swingable plate as in partition forming position from the line VI—VI, Fig. 5.

A motor vehicle or truck has cab 1, chassis 2 therefrom to ground wheels 3, and fuel tank 4. The body herein has floor 5 with cross-sills 6, 7, 8, 9, 10, and connecting short intermediate sills 11. Between the sills 6, 7 are angles 13, and between the sills 9, 10, are angles 14, which snugly locate between the chassis portions 2 for positioning the body on the chassis with the clearance region ample in the region of the rear axle and driving means thereto for clearance as to the bottom 5 of this body. In practice, this is built up of sheet metal weld-assembled with front 15 having reinforcing portions 16 and a screen portion 17 and additional reinforcements 18, 19.

From the bottom 5 and extending away from the front end 15 rise parallel sides having vertical portion 20, flare portion 21 to upper sides 22. Adjacent the corners or ends of these vertical minor side portions 22 are sockets 23 in which may be located side boards 24 to extend or increase the capacity. Remote from the front end 15 brackets 25 from the bottom locate pin 26 as retained by chain 27 in assembly with the vehicle body. This pin 26 as in position in the brackets 25 engages pivot bar 28 for door or end gate 29 having reinforcing flanges 30 and top bead 31. This end gate as on the hinge pin 29 may be swung to approximate the level of the bottom 5 and is so held by chains 32 extending from eye 33 near the bead 31 to eyes 34 of the terminal flanges 35 extending outward from the rear of the body and determining the ends of the vehicle body sides remote from the front end 15. As swung into flat position for the end gate 29, side shields 36 on hinges 37 may swing away from toward each and against the respective chains 32 in providing a shovel chute way for unloading the body as to the end gate 29.

For closure operation, these wings 36 are swung toward each other, the end gate 29 is swung upwardly, and pins 38 are inserted through brackets 39 to engage extension rod 40 from the eye 31. The wings 36 are thereby held by this end gate 29 into closure position in completing the vehicle body as a single capacity chamber.

Supplementally, hinge pins 41 may mount arms 42. This location from the pins 41 is of the distance of the arms 42 from the front end 15. This, in practice, may be about one-quarter the length of the sides 20 or the bottom 5. With such a proportion, plate 43 as engaged at the free ends of the arms 42 provides a partition which at the down position provides front container portion 44 and approximately equal rear container portion 45. There is thus dual capacity for this vehicle body.

This plate 43 has bottom flange 46, intermediate angles or reinforcements 47, 48, and top flange 49. The configuration of this plate 43 is for the flange 46 to rest on the bottom 5, and flanges 50 to conform to the sides 20, 21. At out-of-use position, the plate 43, as swinging on the hinge pins 41, has the flange 49 rest on the upper terminus of the flare 21 as a seat and the plate 43 in parallelism and adjacent the plate or end 15. There is thus a single full capacity position for this vehicle body.

However, as it may be desired to carry more than one type of goods or commodity, it is only necessary to swing the arms 42 to bring the plate 43 away from its position in there forming an end gate extension spaced from the floor or bottom 5 and adjacent the end 15. In this swinging from end gate extension position the plate 43 is moved down into partition forming position. As so located, handle 51 fixed with bar 52 may be thrust downwardly. This bar 52 is held in eyes 53 fixed with the plate 43. Outwardly from the terminal eyes 53 this bar 52 has eccentric crank arms or lugs 54 welded therewith. Accordingly, at thrust down position of the handle 51 these lugs 54 swing from below the rod 52 upward toward the end 15 and thereby ride behind lugs 55 weld-attached to the sides 20. There is thus a supplemental holding of this partition 43 in addition to that by the arms 42. This will permit the charging of the vehicle with a load, say only in the rear compartment 45, or with a load only in the front compartment 44, or with one type of load in the compartment 44 and a different type of load or material in the compartment 45.

With the vehicle reaching the place for discharge, it is only necessary to obtain access for removal in the usual way, whether from the top or through the end gate, and then, after clearing the material from the rear compartment 45, release the partition 43 by pulling the handle 53 upwardly, and, as thereby unlatching, swing such forwardly toward the front end 15, thereby rendering more accessible the material in the compartment 44.

There is herein provided a generally weld-assembled, substantial, light weight, sheet metal vehicle body of strength to handle bulk materials such as coal, stone, sand, etc., as well as grain, vegetables, or other materials as may be elected. This body may be readily placed or removed and has a flexibility for a wide range of haulage purposes.

Terminal flanges 56 in their extent spaced from the sides 20 extend at the ends of these cross-sills 6, 7, 8, 9, 10, and over these sills there extends plate or running board 57 with fender portion 58 to clear the wheels 3 and extension 59 therefrom forward to the end 15 in general stiffening of the body structure. Furthermore, this rear running board 57 may have gooseneck or passage 60 therethrough for access to the fuel tank 4. These running board extensions 57, 59, with the flare on the sides establish a longitudinal rigidity for this structure, notwithstanding the lightness of its weight. Flanges 61 stiffen the top of the sides 22.

What is claimed and it is desired to secure by Letters Patent is:

1. A commercial vehicle body forming a major compartment and having sides, a bottom therebetween and a connecting end for the termini of the bottom and sides, a plate, a swingable mounting for locating the plate in out-of-use position adjacent the end to form an end gate extension, said mounting being located for swinging the plate therefrom into in-use position as a partition thereby to enclose a complete minor compartment from a portion of said major compartment and between the sides and spaced from such end, whereby said partition, sides and end form an endless bounding wall about a portion of said bottom.

2. A commercial vehicle body having a bottom, and a pair of parallel flare sides and an end rising from the bottom, a plate terminally configured to the sides, a mounting for the plate adapted to swing the plate to rest on the sides, and, as so positioned between the sides, providing a partition and adapted to form an end gate extension for a compartment between said end and partition as connected by said bottom and side portions.

3. A commercial vehicle body having a floor, a pair of parallel flare sides, a connecting end rising from the floor, a plate, a hinge mounting for the plate spaced from the end and adapted to swing the plate into proximity to such end in there forming an end gate extension spaced from the floor and adapted to swing away from such end into partition-forming position to abut the floor between the sides and there connecting the sides and ends to bound a portion of the floor as a vehicle body minor compartment.

HARRY V. POWNELL.